United States Patent Office
3,438,760
Patented Apr. 15, 1969

3,438,760
METHOD OF COLORING GLASS
David Gordon Loukes, Eccleston Park, Prescot, and Edward Albert Buckley, Liverpool, England, assignors to Pilkington Brothers Limited, Liverpool, England, a company of Great Britain
No Drawing. Filed June 21, 1965, Ser. No. 465,733
Claims priority, application Great Britain, June 23, 1964, 25,954/64
Int. Cl. C03c 17/06
U.S. Cl. 65—30    9 Claims

ABSTRACT OF THE DISCLOSURE

A method of treating glass containing on the surface a reducing agent, comprising treating the surface with metal which does not normally exhibit a valency 1 or compound of such metal at an elevated temperature to introduce some of the metal into the glass.

---

This invention relates to glass articles, and more particularly but not exclusively to flat glass. The invention is concerned with the treatment of glass articles having in at least a part of their surface a reduced compound of an element which exhibits more than one valency state, for example a reduced tin compound.

Experiments have shown that certain desired characteristics may be imparted to glass articles containing in at least a part of their surface a reduced compound of an element which exhibits more than one valency state by treating the said part of the surface of the glass article with a metal which does not normally exhibit a valency of 1 or a compound of such a metal for a sufficient time and at a sufficient temperature to introduce some of the said metal into the glass surface. Preferably the reduced compound present in the said part of the surface of the glass article is a reduced tin compound.

In particular it has been found that the surface of a glass article which contains a reduced tin compound may readily be stained to impart colour to the glass surface by treating the said surface of the glass with a compound of a metal which does not normally exhibit a valency 1 at an elevated temperature, for example from about 450° C. to about 750° C.

According to this aspect, therefore, the present invention provides in the manufacture of a glass article the step of colouring at least a part of the surface of the article by contacting the said part of the glass surface, which part contains a reduced tin compound, with a colouring metal which does not normally exhibit a valency of 1 or a compound of such a colouring metal for a sufficient time and at a sufficient temperature to introduce the said metal into the glass surface and impart a desired colouring thereto.

Manganese, iron, cobalt and nickel are examples of metals which have been introduced into the surface of the glass in accordance with the present invention to impart colour thereto.

More particularly the present invention provides in the manufacture of a glass article the step of introducing a stannous compound into at least a part of the surface of the glass article and then treating at least the said part of the surface with another metal which does not normally exhibit a valency of 1 or a compound of such another metal for a sufficient time and at a sufficient temperature to introduce some of the said other metal into the glass surface and to impart a desired characteristic, for example a desired colouring, thereto.

The reduced tin compound may be introduced into the surface of the glass article by contacting the glass article with a vapour of a stannous compound, for example stannous oxide or stannous chloride, or indeed, the glass article may be contacted directly with a molten stannous compound or with molten tin.

One particular example of a glass article having a reduced tin compound present in at least a part of its surface is flat glass which has been subjected to a treatment during which at least one surface of the glass is in contact with molten tin or a molten alloy of tin.

According to this aspect, therefore, the present invention comprehends in the manufacture of flat glass the step of treating at least a surface of the flat glass which has previously been in contact with molten tin with another metal which does not normally exhibit a valency of 1 or a compound of such another metal for a sufficient time and at a sufficient temperature to introduce some of the said other metal into the glass surface.

More particularly according to this aspect, the present invention provides in the manufacture of flat glass during which the glass is in contact with molten tin the step of colouring the glass surface which has been in contact with the molten tin by contacting the said glass surface with another metal which does not normally exhibit a valency of 1 or a compound of such another metal for a sufficient time and at a sufficient temperature to introduce the said metal into the glass surface and impart a desired colouring thereto.

It is thought that the colouring or staining of the glass in accordance with the preferred method of performing the present invention is facilitated by the presence in the glass surface of stannous oxide, which is probably the most powerful influence on the development of the colour or stain once ions of the colouring element have entered the surface of glass containing a reduced tin compound.

Furthermore it is thought that the introduction of the metal into the glass surface to impart the desired characteristic, for example colouring, thereto is enhanced by an ionic exchange between some of the ions of tin, for example stannous ions, in the said surface of the glass and ions of the metal during the treatment with the compound of the metal having a valency greater than 1.

Accordingly the present invention also provides in the manufacture of flat glass during which the glass is in contact with molten tin, the step of colouring the glass surface which has been in contact with the molten tin by contacting the said glass surface with a colouring metal which normally exhibits a valency greater than 1 or a compound of such a colouring metal under conditions which will cause said metal to enter the said glass surface whereby there is imparted a desired colouring to the surface of the glass. Any colours so produced are probably the result of reduction to the metallic state of ions of the colouring metal by the stannous ions already present in the surface of the glass.

A number of alternative methods of contacting the said surface of the glass with the compound of the metal may be employed, for example the metal compound may be made into a paste and applied to the said surface of the glass, or a solution of the metal compound may be sprayed on to the glass surface.

In each case, however, the treatment is preferably effected in a temperature range from about 450° C. to 700° C. for periods of five minutes, ten minutes or longer, the longer periods being generally used for the lower temperatures.

The compound with which the said glass surface is treated may be a metal chloride, a metal bromide, a metal sulphide, a metal oxide, a metal nitrate or a metal sulphate. Preferred examples of the compounds to be used in accordance with the invention are nickel chloride, nickel sulphide, nickel oxide, nickel bromide, manganous chloride, ferrous chloride and cobalt chloride.

Alternatively, however, the glass surface containing the reduced tin compound may have applied to it a layer of the molten colouring metal or a molten alloy containing the colouring metal. As a further alternative, the glass surface containing the reduced tin compound may be treated by depositing thereon a thin film of metal, for example by a vacuum deposition method, and subsequently oxidising the metal to form a thin film of metal oxide on the surface of the glass.

Also, mixtures of one or more of the metal compounds may be employed, for example an aqueous paste of nickel suphide and cobalt sulphite has given good results.

Furthermore it has been found that colouring metal having a valency of more than 1 may be introduced also into the surface of the flat glass which is the upper surface of the glass when the glass is floated on the molten tin. The manufacture or treatment of flat glass on molten tin generally takes place in a reducing atmosphere with the result that the upper surface of the flat glass has reducing characteristics although these are not as strong reducing characteristics as those in the surface of the flat glass which has been in contact with the molten tin. It is thought that the treatment of flat glass under reducing conditions makes the surfaces of the glass more likely to develop reduced metallic colours.

The present invention further comprehends glass articles whenever prepared by the methods of treatment as herein set forth.

As examples, the colours imparted to glass by the method of the invention are red and brown stains obtained from iron, manganese, nickel and cobalt.

In particular the invention comprehends glass exhibiting a red or brown colouring due to the presence of iron, manganese, nickel or cobalt in the glass.

The invention further comprehends glasses which exhibit different colours to reflected and transmitted light, and particularly such glasses containing copper, nickel or cobalt compounds.

More particularly the invention comprehends glasses containing copper, nickel or cobalt compounds and exhibiting a substantially red colour to reflected light and a substantially blue colour to transmit light.

Some examples of treatments of flat glass in accordance with the present invention will now be described, purely by way of example.

Example 1

A sheet of flat glass cut from a ribbbon of glass manufactured by a process in accordance with U.S. Patent No. 3,083,551 had a solution of ferrous chloride sprayed on both surfaces of the glass sheet to form films thereon. The glass sheet having these films comprised of a solution of ferrous chloride was heated to a temperature of 700° C. and maintained at this temperature for a period of ten minutes.

After cooling to ambient temperature the glass was washed to remove any remnant of solid remaining on the surface, and the glass was found to exhibit a strong orange-red colour.

Example 2

A sheet of flat glass cut from a ribbon of glass manufactured by a process in accordance with U.S. Patent No. 3,083,551 had applied to both surfaces an aqueous paste of nickel sulphide. The glass sheet having the aqueous paste of nickel sulphide was heated to a temperature of 600° C. and maintained at this temperature for approximately ten minutes.

After cooling to ambient temperatures the glass sheet was washed to remove the remnant of the paste and each of the glass surfaces was found to be coloured. The surface of the glass which had been in contact with the molten tin during the manufacture of the flat glass exhibited a reddish-brown colour, while the other surface of the glass which had merely been in contact with the atmosphere in the manufacture of the glass exhibited an amber colour. The intensity of the reddish-brown colour was much greater than the intensity of the amber colour.

Example 3

A sheet of glass cut from a ribbon of glass manufactured by a process according to U.S. Patent No. 3,083,551 was placed with the surface which had been in contact with the molten tin in contact with molten manganous chloride at 670°–700° C. The treatment was continued for ten minutes after which it was found that the glass surface contained a deposit which was not removable by washing with water, but was removable by abrasion.

The surface of the glass after removal of the deposit exhibited a very strong red colour which was so intensive that the glass was almost opaque.

Example 4

A sheet of flat glass cut from a ribbon of flat glass manufactured by a method in accordance with U.S. Patent No. 3,083,551 was treated with an aqueous paste of cobalt sulphide applied to both surfaces of the glass sheet, which was then maintained at a temperature of 600° C. for a period of ten minutes.

After cooling to ambient temperature and washing away the remnant of the paste with water, it was found that the glass surface which had been in contact with the molten tin during manufacture appeared red to reflected light and blue to transmitted light. In each case the colour was of medium intensity.

Example 5

A sheet of glass cut from a ribbon of glass manufactured by a process according to U.S. Patent No. 3,083,551 was treated on both surfaces with a paste of cobalt oxide in glycerol. The glass sheet having the paste thereon was heated to a temperature of 600° C. for a period of ten minutes, and after cooling and washing, the glass sheet was found to have a reddish colour of medium intensity in the surface which had been in contact with the tin during manufacture.

In all the examples which have been given of the practice of the present invention, the reduced compound present in the glass has been a reduced tin compound, but similar results may be obtained by treating the glass article in order to introduce into the surface thereof a reduced arsenic compound or a reduced lead compound before the treatment with the compound of the metal which normally exhibits a valency greater than one is undertaken.

As an alternative to the use of a reduced compound of tin, arsenic or lead another appropriate reducing agent may be introduced into that part of the surface of the glass article which is to be coloured.

The present invention further comprehends processes in which, after a colouring element has been introduced into the surface of the glass article, an additional heating stage in a nonoxidising atmosphere is effected to develop the colour in the glass.

We claim:

1. A process of colouring a glass article, comprising the step of introducing a stannous compound as a reducing agent by exposing at least a part of the surface of a glass article to a stannous compound until said part of the surface embodies stannous compound in sufficient amount for reaction with a colouring material subsequently applied, and subsequently treating at least the said part of the surface at a temperature from about 450° C. to about 750° C. for from about 5 to about 10 minutes with a material of the group consisting of compounds of manganese, iron, cobalt and nickel in a nongaseous phase to introduce some of the said metal into the glass surface whereby colour is effected in the glass.

2. A method according to claim 1 wherein the glass article after the said treatment is heated in a nonoxidising atmosphere to develop the desired colouring in the glass.

3. A method according to claim 1 wherein the stannous compound is introduced into the surface of the glass article by contacting the glass article with a vapour of the stannous compound.

4. A method according to claim 1 wherein the stannous compound is introduced into the surface of the glass article by contacting the glass article with a member of the group consisting of molten stannous compound and molten tin.

5. A method according to claim 1 wherein the stannous compound is a member of the group consisting of stannous oxide and stannous chloride.

6. A method according to claim 1 wherein the glass surface is treated by contacting the glass surface with a paste of a compound of said metal.

7. A method according to claim 1 wherein the glass surface is treated by spraying onto the glass surface a solution of a compound of a said metal.

8. A method according to claim 1 wherein the metal compound is a member of the group containing a metal chloride, a metal bromide, a metal sulphide, a metal nitrate, a metal sulphate and a metal oxide.

9. A method according to claim 1 wherein the glass surface is treated by applying a layer of one of the group consisting of the molten colouring metal and a molten alloy containing the colouring metal to the glass surface and when said metal is employed subsequently oxidising said layer to form a thin film of metal oxide on the surface of the glass.

References Cited

UNITED STATES PATENTS

| | | | |
|---|---|---|---|
| 3,012,902 | 12/1961 | Bayer | 65—30 |
| 3,284,181 | 11/1966 | Harrell et al. | 65—31 |
| 3,250,604 | 5/1966 | Toytot et al. | 65—65 |
| 2,326,012 | 8/1943 | Dalton | 65—60 X |

OTHER REFERENCES

Weyl: Coloured Glasses, Dawson's of Pall Mall, London, 1959, pp. 212–216.

DONALL H. SYLVESTER, *Primary Examiner.*

ARTHUR D. KELLOGG, *Assistant Examiner.*

U.S. Cl. X.R.

65—32, 33; 117—124